Patented Feb. 28, 1939

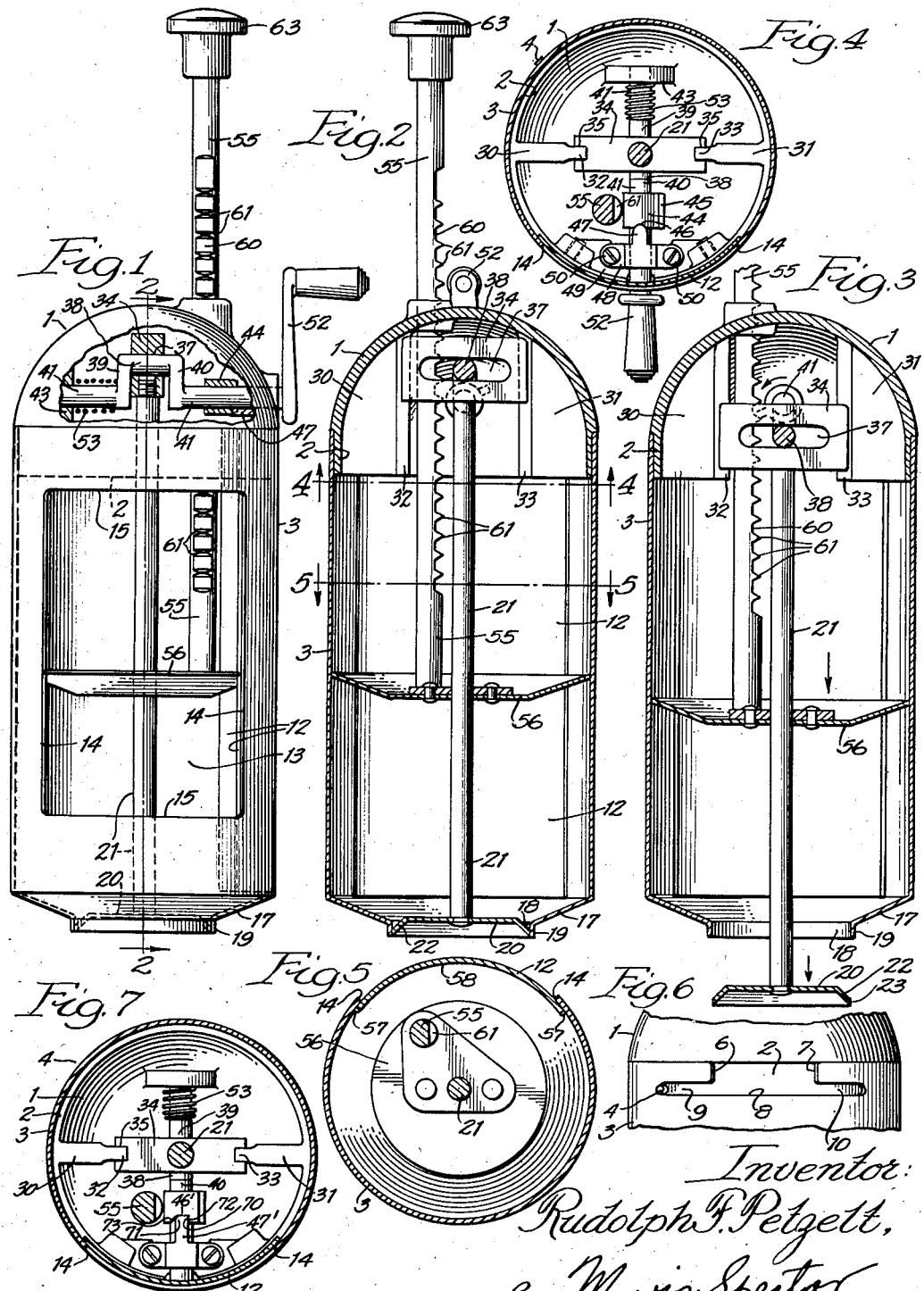

2,148,774

UNITED STATES PATENT OFFICE 2,148,774

DEVICE FOR FORMING DOUGHNUTS OR THE LIKE

Rudolph F. Petzelt, Chicago, Ill., assignor to Master Doughnut Machine Company, Chicago, Ill., a corporation of Illinois Application June 16, 1938, Serial No. 214,069

10 Claims. (Cl. 107—14)

This invention relates to aliment forming apparatus and particularly apparatus for forming doughnuts or the like.

In its more particular aspects, this invention relates to such apparatus which is sufficiently simple in construction, to adapt it for domestic use and sufficiently small in size that it may be held in the hand during operation, thereby obviating the need of supporting stands or the like.

It is one of the objects of the present invention to provide a portable, small, contact aliment-forming apparatus of the above-mentioned character, which is simple and reliable in its operation and is so constructed and arranged as to enable cleaning thereof quickly and easily. This result is obtained in one embodiment of the invention by a construction wherein there are few sharp corners where dough or the like may become caked, and wherein there are very few major parts and which may be easily taken apart for individual cleaning.

It is a still further object of the present invention to provide an operating mechanism of the type having a single operator which, by a continuous motion, produces a reciprocating motion of a dough cutter, and an intermittent motion of a piston or the like for extruding the dough. This is the type of mechanism shown in general in the patent application of John Korpan, Serial No. 191,048.

In accordance with the teachings of the present invention, there is provided, in one embodiment of the invention, an operating mechanism of the above-mentioned character, so arranged as to give a definite signal to the operator upon the completion of each cycle of operation, one cycle consisting of the means for producing one complete doughnut. The above result is obtained by providing a mechanism which will move with a snap action as the cycle of operation is being completed. The snap action serves to advise the operator that one cycle of operation has been completed. In addition, if desired, there may be provided means for producing a noise as each cycle is being completed, whereby the operator is thereby additionally advised of the completion of an operation.

It is a still further object of the present invention to provide an apparatus of the above-mentioned character wherein the operating parts are fully enclosed and of such simple construction that reliability of operation is assured.

It is a still further object of the present invention to provide a doughnut forming apparatus of the above class wherein the operator can be turned in only one direction, being locked against reverse operation. This increases the reliability of the same in the hands of the average nonmechanically-inclined person using the same.

The attainment of the above and further objects of the present invention will be apparent from the following specification taken in conjunction with the accompanying drawing forming a part thereof.

In the drawing:

Fig. 1 is an elevational view of an apparatus embodying the present invention, said apparatus being shown with the casing turned to its uncovering position;

Fig. 2 is a longitudinal sectional view of the apparatus shown in Fig. 1 taken along the line 2—2;

Fig. 3 is a view corresponding to Fig. 2, showing the operating apparatus in an alternate position;

Fig. 4 is a sectional view taken along the line 4—4 of Fig. 2 and looking in the direction of the arrows;

Fig. 5 is a sectional view taken along the line 5—5 of Fig. 2 and looking in the direction of the arrows;

Fig. 6 is a fragmentary view of the front portion of the apparatus and illustrating the manner of securing the casing to the head, and Fig. 7 is a view corresponding to Fig. 4 and illustrating a modified construction.

Reference may now be had more particularly to the apparatus shown in Figs. 1 to 6 inclusive. This apparatus comprises a head portion 1, of a generally hemi-spherical shape in which the operating mechanism is contained, and to which the body of the container is removably secured. The head portion 1 terminates in a cylindrical flange 2 which is adapted to receive a cylindrical container 3. The container 3 is cut away adjacent the top thereof for receiving a short pin 4 that is permanently secured to the flange 2 to form a short slot defined by the edges 6 and 7, and a longer slot 8 which extends through approximately one-third of the periphery of the container 3, forming bayonet slots 9 and 10 for receiving the pin 4 as the container is rotated on the flange 2 from one extreme position to the other. The pin 4 thus limits the extent of turning of the container on the flange as determined by the spacing between the ends of the bayonet slots 9—10. A short cylindrical strip 12 is permanently secured to the flange 2 and extends longitudinally of the cylindrical container 3. The cylindrical wall of the container 3 is cut away to provide a rectangular opening 13 which extends almost the full length of the cylinder, and of an arcuate width slightly less than the arcuate width of the arcuate strip 12. The longitudinal sides of the opening 13 are indicated by the reference numerals 14, and the lateral sides indicated by the reference numerals 15. When the cylindrical container is in the position illustrated in Fig. 6, that is, with the pin 4 in the bayonet slot 9, the edges 14—14 of the rectangular opening 13 are on opposite sides of the cylindrical strip 12 so that the strip 12 constitutes a closure for the opening 13. If the container 3 is rotated on the flange 2 until the bayonet slot 10 receives the pin 4, thus limiting the amount of rotation, the opening 13 is uncovered. In the actual operation, the operator holds the cylindrical container and turns the head 1 so that the opening 13 always remains horizontal and uppermost, while the cylindrical strip 12 is turned from a position covering the opening to a position uncovering the opening.

At its base the cylindrical container 3 is formed with a peripherally inturned flange 17 constituting a closure for one end of the cylindrical container. This closure has a central extruding opening 18 surrounded by a short cylindrical flange 19 which constitutes the stationary part of a cutting apparatus to be hereafter described. A co-operating cutter 20, mounted at the end of a reciprocating cutting rod 21 constitutes a closure for the opening 18 in the position of the cutter illustrated in Fig. 2, and is movable to a position illustrated in Fig. 3, where it uncovers the opening 18 to permit extrusion of the dough. The cutter 20 has a frusto-conical portion 22 and is cut away to form a cylindrical cutting edge 23 that fits snugly inside the cylindrical flange 19. The cutter rod 21 is reciprocated by the operating mechanism located within the head portion 1.

A description will now be given of the construction of the operating mechanism within the head 1. The head is provided with two inwardly facing ribs 30—31 as an integral part of the casting, which ribs form longitudinally extending guideways 32—33 for a block 34 that is provided with longitudinal grooves 35 that ride on the guideways 32—33. The upper end of the reciprocating cutter rod 21 is secured to the block 34 and actuated thereby. The block 34 has a slot 37 across the same for receiving a crank 38. The crank 38 is rigidly connected to two crank arms 39—40 mounted on a shaft 41. The shaft 41 is journaled in an ear 43 which is cast as an integral part of the head 1, and projects inwardly thereinto. The end of the shaft merely passes through a hole in the ear so that the shaft is rotatable therein. The opposite end of the shaft 41 extends through a slot in the flange 2 and adjacent spherical part of the head. The shaft 41 carries a gear segment 44 that contains only one gear tooth 45. The gear segment 44 has a rounded notch 46 at one end thereof for receiving the rounded end of a projecting prong 47 formed on a strip of metal 48 that is secured to a thickened portion 49 of the head portion by means of a pair of screws 50. The metal strip 48, together with the thickened portion 49 constitute a bearing for the opposite end of the shaft 41. A handle 52 is removably secured to the extended end of the shaft portion 41 for turning that shaft. A coil spring 53, which extends between the ear 43 and the crank arm 39 constantly urges the shaft, with the crank arms and gear segment 44 toward the position illustrated in Fig. 4, the notch 46 being opposite the prong 47 when the cutter 20 is in the position illustrated in Fig. 2.

A cylindrical rod 55 is slidable through the head 1 and has a plunger or piston disc 56 secured to the inner end thereof. The plunger, or piston disc 56, fits snugly within the cylindrical container 3, and has a slight cut-away portion 57 whereby the same embraces the edges of the arcuate strip 12 so that the arcuate portion 58 of the piston disc fits snugly against the interior surface of the arcuate strip 12. The rod 55 has a gear rack 60 formed thereon, the teeth 61 of which are comparatively widely spaced. The teeth of the gear rack 60 are adapted to be engaged by the one tooth 45 of the gear segment 44 so that with each rotation of the gear segment, the gear rack is advanced one tooth. The spacing between adjacent teeth is so correlated with the diameter of the piston disc 56 a linear displacement equal to the distance between adjacent teeth 61 causes an extrusion of the exact amount of dough required for the formation of a single doughnut. A knob 63, threaded, or otherwise removably secured to the end of the cylindrical rod 55, constitutes a means for external manipulation of the rod and piston 56, as when it is desired to retract the piston disc for the filling of the container 3 with dough, or for enabling movement of the disc independently of the handle 52 for cleaning purposes.

The operation of the apparatus thus far described is as follows: The apparatus is held in a horizontal position with the opening 13 uppermost. The head is then rotated to move the cylindrical strip 12 into a position uncovering the opening 13. The handle 52 is turned to move the cutter 20 into the position illustrated in Fig. 2, in which position the tooth 45 of the gear segment is out of engagement with the rack 60 so that the rack can be moved to bring the piston disc 56 adjacent the flange 2 of the head 1. The necessary amount of dough or other product to be extruded is then placed into the container through the opening 13. The head 1 is then turned to bring the strip 12 back to a position covering the opening 13. Thereafter the apparatus is held so that it extends vertically with the extruding opening lowermost in the position illustrated in Figs. 2 and 3. It may be held directly over a vat or other receptacle containing the oil used in the cooking of the doughnuts, or above a board or the like, upon which the material may be extruded. Thereafter the handle 52 is turned. With each revolution of the handle, the crank 38 reciprocates the block 34 on the guideways 32—33, thus reciprocating the cutter rod 21, and the cutter disc 20. It also advances the rack 60 one notch for each revolution of the handle. The initial turning of the handle, when the apparatus is in the position illustrated in Fig. 2 results in a downward movement of the cutter rod 21 to uncover the opening 18. At this time the piston disc 56 is not being moved. Thereafter, when the opening 18 has been substantially uncovered, the gear tooth 45 engages a tooth 61 on the rack 60 and advances the piston 56. For a very short distance there is motion of the piston and of the cutter disc, but it is to be noted that when the tooth 45 is at substantially right angles to the rack, and therefore the rack is moving at its maximum velocity in relation to the handle 52, the crank arms 39 are almost, but not quite, at right angles to the slot 37 so that the motion of the cutter disc is very slight. Thereafter upon continued rotation of the handle, the crank returns the cutter disc to the position illustrated in Fig. 2, but not until the tooth 45 has entirely cleared the teeth 61 on the rack, so that during the return or closing operation of the cutter disc 20, the piston 56 is not being forced downwardly. Also, it is not held against upward movement. Upward movement of the disc 56 and the dough below it is prevented substantially entirely by gravity and by the frictional resistance between the dough and the walls of the container 3. When the handle is returned to the position illustrated in Fig. 2, the finger 47 comes opposite the notch 46 in the gear segment 44 so that the spring snaps the gear segment toward the finger. This serves to signal the operator that one operation has been completed. Continuous rotation of the handle 52 results in repeated operations of this cycle, forming one doughnut or the like, with each cycle, and giving the operator the signal upon the completion of each cycle. Not only does the operator feel the completion of each cycle by reason of the greater force that must be applied momentarily to push the notch 46 of the gear segment out of the finger 47, against the action of the spring 53, but also there may be a slight noise or click as the notch springs into position embracing the finger.

If desired, means may be provided for preventing reverse rotation of the handle 52, that is, for preventing rotation of the handle 52 in a direction to draw the piston 56 away from the opening. This result may be obtained by forming the notch 46 and the finger 47 in a somewhat different manner. In Fig. 7 this alternate construction has been illustrated. In this construction the finger 47', which corresponds to the finger 47, is square at its upper right hand corner 70, as illustrated in Fig. 7, and may or may not be rounded at its opposite corner 71. The notch 46' which corresponds to notch 46, is square at the corner 72 which receives the corner 70 of the finger 47' and is rounded at its opposite corner 73. Thus, if an attempt is made to rotate the shaft in a direction to the right, as seen in Fig. 7, so that the rounded edge 73 of the notch 46' rides over the finger 47', the operation of the apparatus is the same as previously described. On the other hand, if an attempt is made to rotate the shaft in the opposite direction so that the square corner 72 tends to move to the left, as seen in Fig. 7, this corner will not ride over the square corner 70 of the finger so that the finger 47' will lock the gear segment against rotation in that direction.

In compliance with the requirements of the patent statutes I have herein shown and described a few preferred embodiments of the present invention. It is, however, to be understood that the invention is not limited to the precise construction here shown, the same being merely illustrative of the principles of the invention. What I consider new and desire to secure by Letters Patent is:

1. Dough-forming apparatus comprising a head portion, dough advancing and cutting means carried thereby and extending therefrom, operating mechanism for said means within said head, and a dough container removably secured to said head and embracing said means.

2. Dough-forming apparatus comprising a head portion, dough advancing and cutting means carried thereby and extending therefrom, operating mechanism for said means within said head, a dough container removably secured to said head and embracing said means, and a bayonet joint connection between said head and said container.

3. Dough forming apparatus comprising a head portion, dough advancing and cutting means carried thereby and extending therefrom, operating mechanism for said means within said head, a dough container removably secured to said head and embracing said means, said container having a filling opening, and a cover for said opening carried by said head and movable to cover and uncover the opening by turning of the head on the container.

4. Dough-forming apparatus comprising a head portion, dough advancing and cutting means carried thereby and extending therefrom, operating mechanism for said means within said head, a dough container removably secured to said head and embracing said means, said container having a filling opening, a cover for said opening carried by said head and movable to cover and uncover the opening by turning of the head on the container, and a pair of bayonet joints formed between the head and the container for holding the two together in the position covering the opening and in the position uncovering the opening.

5. Dough-forming apparatus comprising a head portion, dough advancing and cutting means carried thereby and extending therefrom, a dough container removably secured to said head and embracing said means, operating mechanism for said means within said head and including a rotary shaft journaled in the head portion, a crank arm on said shaft, a block mounted for reciprocating movement in the head, guideways for the block, a pin and slot connection between the block and the crank, and an operating connection between the block and the dough cutting means.

6. Dough-forming apparatus comprising a head portion, dough advancing means and dough cutting means both carried thereby and extending therefrom, a rotary element in the head portion, means associated with the rotary element for operating the advancing means during only a fraction of each revolution of the element, means associated with the rotary element for reciprocating the cutting means, a container having a telescopic connection with said head and removable by relative turning of the head and container, said container embracing the dough advancing means and having an extruding outlet covered and uncovered by the dough cutting means in its alternate positions.

7. Dough-forming apparatus comprising a head portion open at one end and closed at the opposite end, dough advancing and cutting means carried by the head portion and extending from the open end thereof, operating means within the head portion for said first named means, a dough container removably secured to the open end of the head portion and closely embracing the dough advancing means, said container having an extruding opening closed and opened by the cutting means in its alternate positions.

8. A dough-forming and cutting apparatus comprising a container for dough, said container having an extruding outlet, dough cutting means at said outlet, a plunger for advancing dough in the container, a rotary element, means associated with the rotary element for advancing the plunger during only a fraction of each revolution of the rotary element and releasing the plunger during the remainder of each revolution of the rotary element, means associated with the rotary element for reciprocating the cutting means to open and close the outlet, and means for effecting a snap movement of the rotary element upon the completion of each cutting operation at the end of each revolution of the element.

9. A dough forming and cutting apparatus comprising a container for dough, said container having an extruding outlet, dough cutting means at said outlet, a plunger for advancing dough in the container, a rotary element, means associated with the rotary element for advancing the plunger during only a fraction of each revolution of the rotary element and releasing the plunger during the remainder of each revolution of the rotary element, means associated with the rotary element for reciprocating the cutting means to open and close the outlet, and means for effecting a snap movement of the rotary element upon the completion of each cutting operation at the end of each revolution of the element, said last named means including means for locking the rotary element against rotation in one direction while permitting rotation in the opposite direction.

10. A dough forming and cutting apparatus comprising a container for dough, said container having an extruding outlet, dough cutting means at said outlet, a plunger for advancing dough in the container, a rotary element, means associated with the rotary element for advancing the plunger during only a fraction of each revolution of the rotary element and releasing the plunger during the remainder of each revolution of the rotary element, means associated with the rotary element for reciprocating the cutting means to open and close the outlet, and means for locking the rotary element against rotation in one direction while permitting rotation in the opposite direction.

RUDOLPH F. PETZELT.